Oct. 8, 1963  S. P. FINOCCHIARO  3,106,303
COLLAPSIBLE CART
Filed Sept. 11, 1961  3 Sheets-Sheet 1
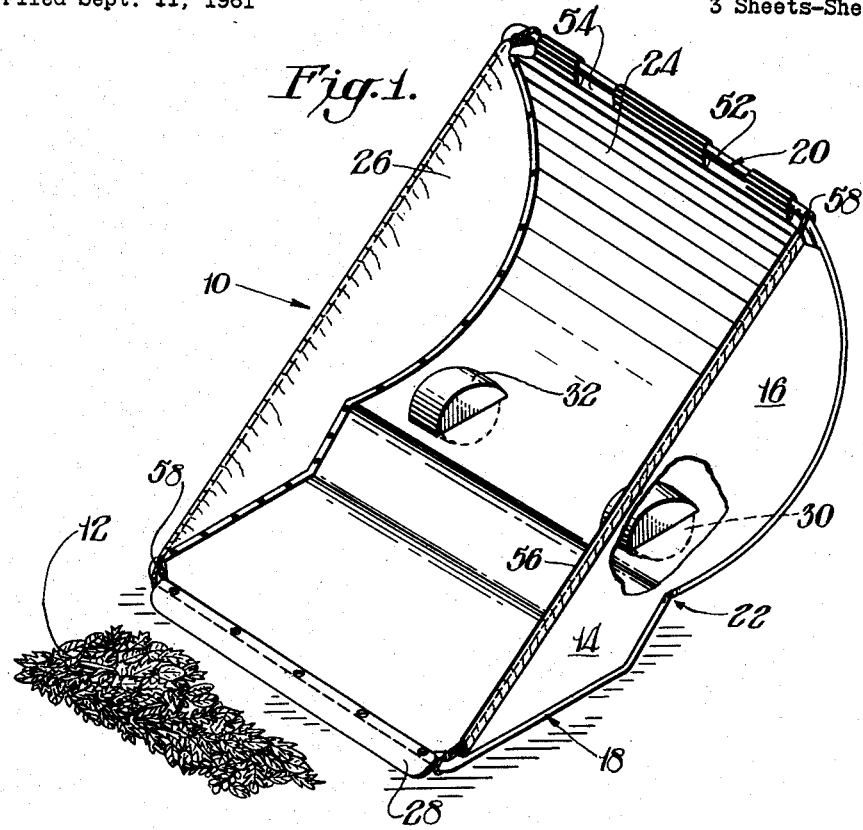
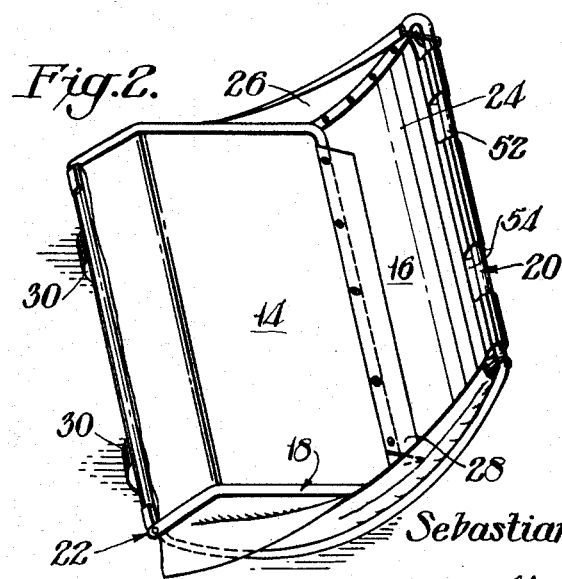
INVENTOR
Sebastiano P. Finocchiaro
BY Connolly and Hutz
ATTORNEYS

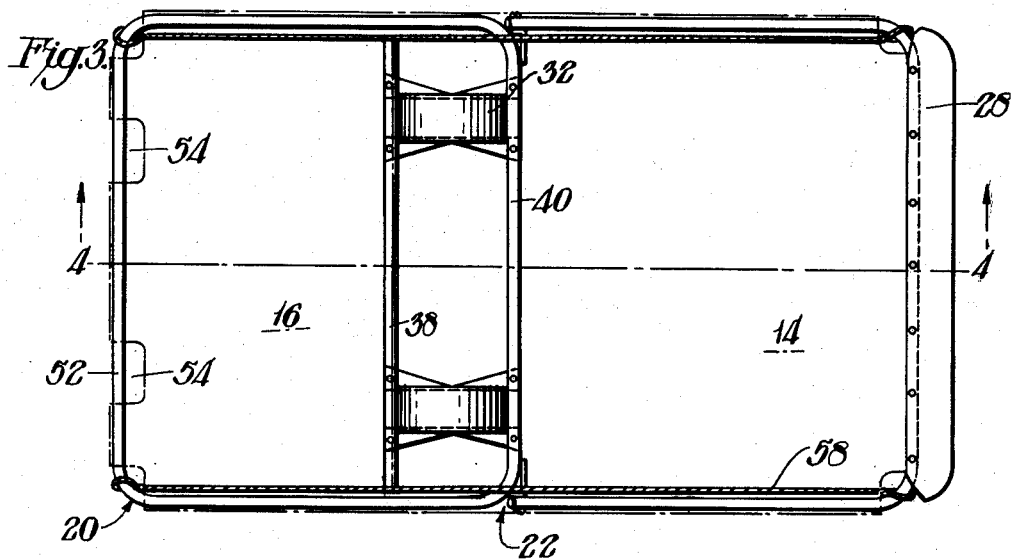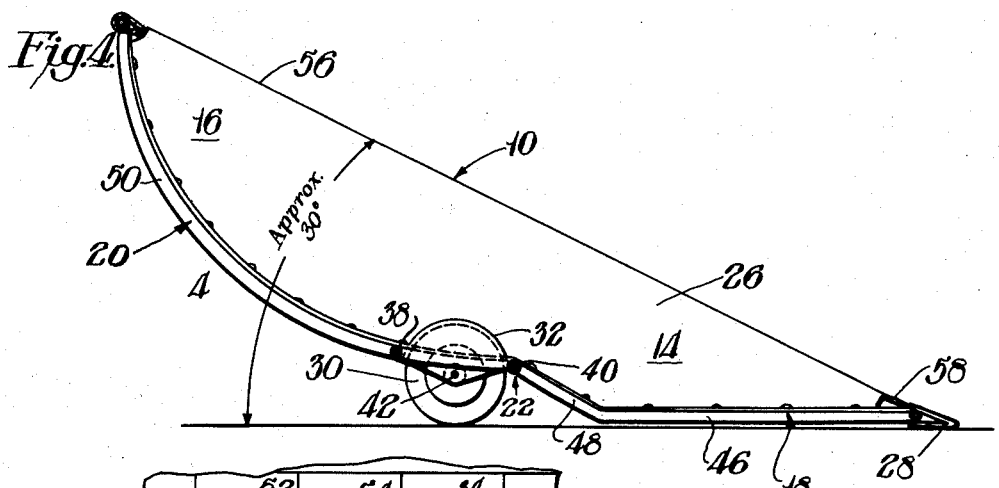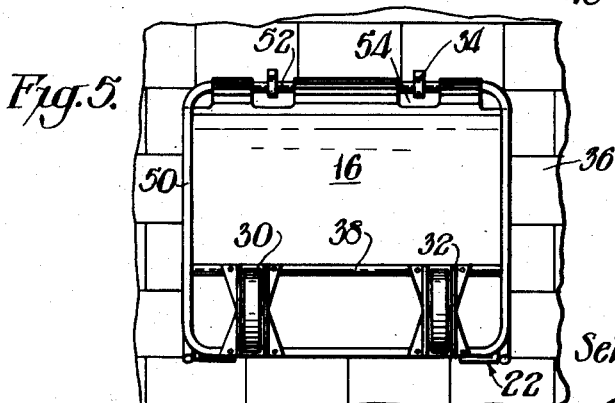

Oct. 8, 1963  S. P. FINOCCHIARO  3,106,303
COLLAPSIBLE CART
Filed Sept. 11, 1961  3 Sheets—Sheet 3
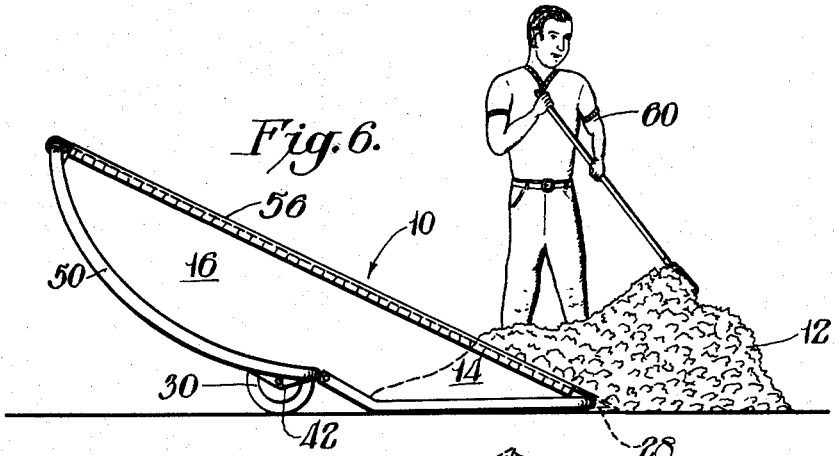
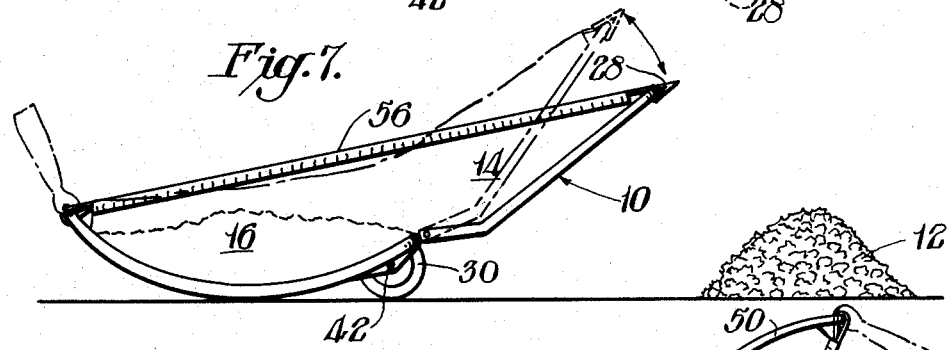
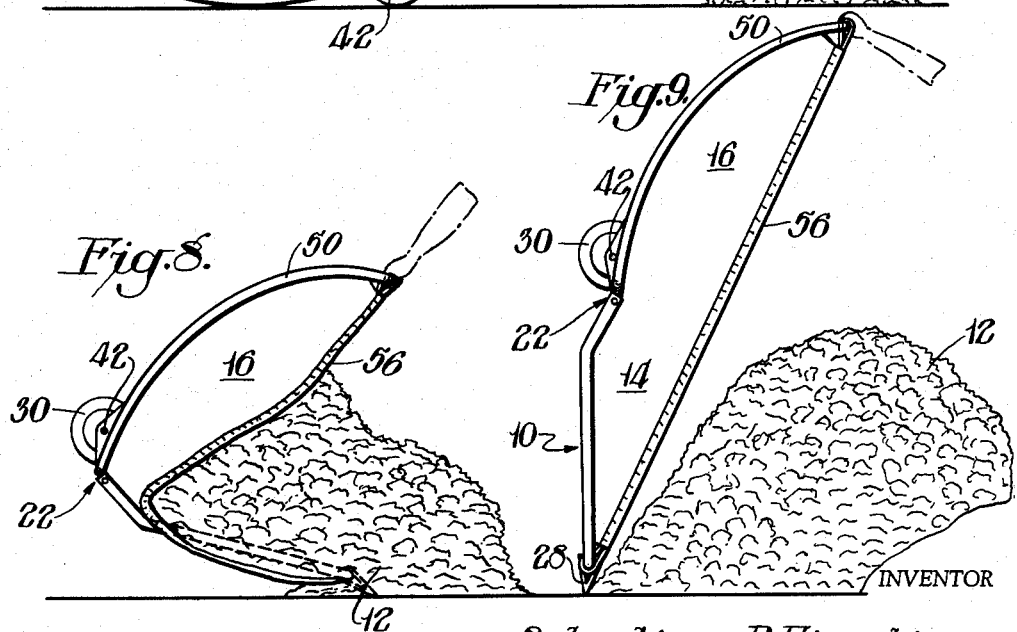
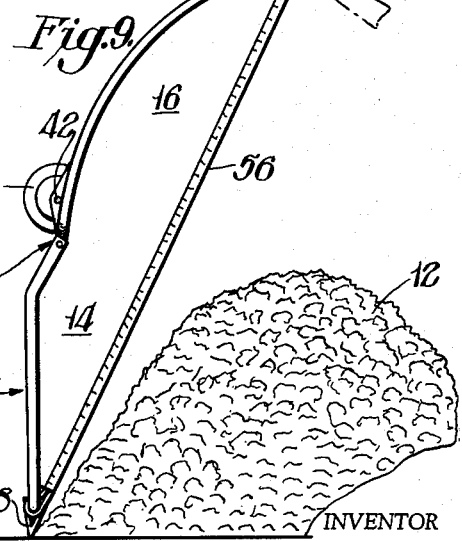
INVENTOR
Sebastiano P. Finocchiaro
BY Connolly and Hutz
ATTORNEYS

3,106,303
COLLAPSIBLE CART
Sebastiano P. Finocchiaro, 423 W. 39th St.,
Wilmington 2, Del.
Filed Sept. 11, 1961, Ser. No. 137,163
10 Claims. (Cl. 214—85)

This invention relates to a collapsible cart for collecting and transporting relatively light and bulky matter, and it more particularly relates to such a cart for collecting and transporting outdoor debris such as leaves, garden clippings and straw.

Various folding carts employing fabric storage sections have been proposed for transporting light and bulky garden debris and refuse such as leaves and various garden clippings. However, the fairly elevated profiles of these existing types of carts makes them rather difficult to load and handle when they are made in large sizes.

An object of this invention is to provide a collapsible cart of simple and economical structure for collecting and transporting relatively light and bulky matter which is convenient for loading, transporting and dumping even in a large capacity size.

In accordance with this invention a collapsible cart having a remarkably low profile and center of gravity includes an elongated dustpan-shaped front section which is hinged in front of a longer elongated deep-bellied rear section. These sections are lightly but rigidly formed of sheet material mounted across rigid frames, and the sheets at least which form the sides are flexible to permit the front section to be folded within the rear section or extended in front of it in a disposition in which the top edges of the flexible sides are stretched substantially straight. A pair of wheels are mounted under the front of the rear section substantially at the center of gravity of the cart to provide a means of transporting and rocking the cart up and down. The floor of the forward portion of the dustpan-shaped front section is substantially flat for resting upon the ground, and in this disposition the structure of the cart is low enough in profile to dispose the top edges of the stretched sides at a shallow angle relative to the ground ranging from approximately 25° to approximately 35°. The cart conveniently maintains itself in the forwardly tilted position to facilitate sweeping of debris over its front edge into the cart.

The floor of the deep-bellied rear section is disposed far enough above the ground to permit it to be rocked downwardly about the wheels a sufficient distance to lift the front end off the ground for redistributing and balancing a load within the cart while it is being transported. Relatively large diameter wheels which facilitate transportion of the cart can be utilized without unduly impairing its depth, capacity or low profile by mounting their axles adjacent the floor of the rear section, and these wheels can be shielded by receiving them within wells which extend upwardly within the floor. Such a cart having structural characteristics that promote its ease of handling and high storage capacity can be made by utilizing bowed frames for the front and rear sections, and the sweeping of the debris over the front end of the front dustpan-shaped section can be facilitated by mounting a substantially flat tongue upon its front edge. The frames can be conveniently made of tubular material, and cables can be conveniently used to support the top edges of the flexible sides and to restrain the sections when extended in front of each other.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention tilted forward upon the ground;
FIG. 2 is a perspective view of the embodiment shown in FIG. 1 in a folded condition;
FIG. 3 is a top plan view of the embodiment shown in FIG. 1;
FIG. 4 is a cross-sectional view taken through FIG. 3 along the line 4—4;
FIG. 5 is a front view in elevation of the embodiment shown in FIG. 1 in a folded vertically stored position; and
FIGS. 6–9 are pictorial side views in elevation of the embodiment shown in FIG. 1 in various phases of utilization.

In FIG. 1, is shown a cart 10 for collecting and transporting relatively light and bulky matter such as leaves 12. Cart 10 is shown in FIG. 1 in a forward tilted position to facilitate the sweeping of the leaves 12 into its dustpan-shaped front section 14 and therefrom into its relatively longer deep-bellied rear section 16. The lower sides and front and rear edges of the front and rear sections respectively are formed by substantially rigid frames 18 and 20 joined at a hinge 22 as later described in detail. Sheet material 24 and 26 is mounted across the frame to respectively form the floor and sides of the cart, and the sheet material 26 forming at least the sides is flexible enough to permit the front section 14 to be folded within the rear section 16 about hinge 22 as shown in FIG. 2. Sheet material 24 of the floor may also be flexible similar to 26, and both may conveniently be made of a plastic material such as Saran or nylon or strong canvas. A tongue 28 made of a V-shaped piece of sheet metal is attached to the front edge of the front section 14 to facilitate sweeping of leaves 12 into the cart 10 when it is tilted forward as shown in FIG. 1.

Wheels 30 are mounted under the front end of rear section 16, for example, within wells 32 substantially at the center of gravity of the cart to provide a means of transporting it and a pivot point about which the front and rear sections may be rocked from the inclined loading position shown in FIG. 1 to the rearwardly inclined transporting position shown in FIG. 7. When the cart is folded as shown in FIG. 2, it can be conveniently hung upon hangers 34 on a wall 36 as shown in FIG. 5 for convenient space-saving storage.

In FIGS. 3 and 4 are shown details of the structure of cart 10 which includes a substantially rigid tubular frame 20 for rear section 16 made, for example, of steel tubing. Frame 20 is substantially rectangular in plan view with a tubular supporting bar 38 secured across the front end of frame 20 a wheel receiving distance from the bar 40 at the front of frame 20. Wheel wells 32 which are, for example, made of sheet steel are secured across bars 38 and 40, and the axles 42 of wheels 30 are mounted adjacent the bottom of rear section 16 to permit relatively large wheels, which are for example ten inches in diameter, to be used for transporting cart 10 without duly impairing the depth of cart, its load carrying capacity and low center of gravity.

FIG. 4 illustrates that frames 18 and 20 are each bowed in side elevation. This provides maximum depth and capacity for these sections concomitant with their other structural relationships. Front frame 18 is bowed into two substantially straight lengths 46 and 48. Length 46 rests upon the ground in the position of cart 10 shown in FIG. 4, and relatively shorter length 48 joins the grounded portion 46 to hinge 22, which is disposed a convenient distance above the ground. As also shown in FIG. 4, lower side bars 50 of rear frame 20 are bowed in substantially continuous curves to provide maximum depth and capacity for rear section 16. This also makes it possible for handle portions 52, which are exposed through fabric cutouts 54, to be disposed at a convenient height for grasping rear section 16. The back end of cart 10 can thereby be conveniently grasped for rocking front end section 14 off the ground to substantially balance load and to transport it.

Top edges 56 of fabric sides 26 are stretched straight in the extended position as shown in FIG. 4 by the stretching of supporting cables 58 which connect the front and rear ends of the sides of frames 18 and 20. The aforementioned frame structure and wheel disposition orients the straightened top edges 56 of fabric sides 26 at a relatively shallow acute angle relative to the ground ranging from approximately 25° to approximately 35°. In FIG. 4 this angle is approximately 30°, and the low profile thereby provided by that angle and those in the neighborhood of the aforementioned range provides a cart of remarkable capacity and maneuverability. Such a cart which is approximately seven feet long measured along top side edges 56 can easily be manipulated by one man as is demonstrated in the following.

As shown in FIG. 3, the side frame lengths 48 of front frame 18 are rotatably connected to the front bar 40 of rear section rectangular frame 40 by hinges 22. The flexibility of cables 58 and flexible fabric sides 26 easily permit front section 14 to be folded compactly within rear section 16, and the entile folded cart can easily be stored out of the way as shown in FIG. 5 to project approximately only one and one-half feet from a four foot vertical distance. This cart can therefore be stored with remarkable convenience despite its great load-carrying capacity.

FIGS. 6–9 demonstrate the remarkable facility of loading, transportation and unloading of cart 10.

In FIG. 6 the cart is disposed and tilted in a forward position in which it will remain by virtue of the disposition of wheels 30 approximately at its center of gravity. A pile of leaves 12 or other light bulky debris can easily be raked over tongue 28 of front dustpan-shaped section 14. After a quantity of leaves is loaded in this remarkably convenient manner into the front section 14, the rear of cart 10 can easily be rocked downward, as shown in FIG. 7, to shift the debris into rear section 16. Front end 14 can then be once again lowered to the ground for receiving more leaves over its lowered front edge. When cart 10 is again lowered the center of gravity of it and its load is still substantially balanced about wheels 30 to permit the front section to be maintained on the ground. The entire cart can be loaded in this manner. After cart is filled, it can easily be transported by grasping the handle sections 52 accessible through fabric cutouts 54 and rolling it to a point where the load is discharged.

A convenient means of discharging the load is described in FIGS. 8 and 9. Rear section 16 is folded over front section 14, as shown in FIG. 8, to deposit the leaves upon the ground. Upon complete inversion and extension of cart 10, it can easily be backed off from the load as shown in FIG. 9. As previously indicated, the cart can be remarkably conveniently folded and stored in a small space after use as shown in FIG. 5 despite its great load carrying capacity.

What is claimed is:

1. A cart for relatively light and bulky matter comprising a dustpan-shaped front section, a relatively longer deep-bellied rear section, substantially rigid frames about the lower sides and respective front and rear edges of said front and rear sections, a hinge means rotatably connecting the front of said rear section frame to the back of said front section frame whereby said front section can be folded within said rear section and extended in front of it, said sections being elongated to front and rear relative to their depth, sheet material mounted across said frames to form the floors and sides of said sections, said sheet material forming said sides being flexible to permit the folding of said sections, securing means reacting between said sections to restrain their extension to a disposition in which the top edges of said flexible sides are stretched substantially straight, a pair of wheels mounted under the front end of said rear section substantially at the center of gravity of said cart to provide a means of transporting said cart and a pivot point about which said front and rear sections may be rocked up and down, the floor of the forward portion of said dustpan-shaped front section being substantially flat and arranged for resting upon the ground in a position which disposes said top edges of said stretched sides at a shallow acute angle relative to said ground ranging approximately from 25° to approximately 35°, the floor of said deep-bellied rear section being disposed far enough above the ground to permit it to be rocked downwardly about said wheels a sufficient distance to lift said front end off the ground and substantially balance a load disposed within said cart while said cart is being transported, the axles of said wheels being disposed adjacent said floor of said rear section to permit substantially large diameter wheels to be utilized without unduly restricting said depth of said rear section, both of said substantially rigid frames of said front and rear sections being bowed in side elevation to provide maximum depth for said front and rear sections, said substantially rigid frames for said rear and front sections being substantially rectangular in plan, said securing means comprising a pair of cables connected between the sides of the front and rear edges of said front and rear sections, and said top edges of said sheet material being connected to said cables.

2. A cart as set forth in claim 1 wherein said top edges of said stretched sides are disposed at an angle of approximately 30° to the ground when said floor of said forward portion of said front section rests upon the ground.

3. A cart as set forth in claim 1 wherein said substantially rigid frames are tubular.

4. A cart as set forth in claim 1 wherein a substantially flat tongue is connected to the front edge of said dustpan-shaped front section to permit matter to be swept over it into said front section when its forward portion is resting upon the ground.

5. A cart as set forth in claim 1 wherein said frame for said front section is bowed into two substantially straight lengths, and said frame for said rear section is bowed in a substantially continuous curve.

6. A cart as set forth in claim 1 wherein said substantially rigid frame for said front section includes a front portion that is U-shaped in plan, and said hinge means rotatably connects the open end of said front U-shaped frame portion to the front side of said rectangular rear section frame which also constitutes part of said substantially rigid frame for said front section.

7. A cart as set forth in claim 1 wherein said floors and sides of said cart are both made of a substantially flexible sheet material.

8. A cart as set forth in claim 1 wherein portions of said sheet material attached to said rear edge of said rear section are cut out to provide access to said rear of the frame of the said rear section for convenient hand-gripping.

9. A cart for relatively light and bulky matter comprising a dustpan-shaped front section, a relatively longer deep-bellied rear section, substantially rigid frames about the lower sides and respective front and rear edges of said front and rear sections, a hinge means rotatably connecting the front of said rear section frame to the back of said front section frame whereby said front section can be folded within said rear section and extended in front of it, said sections being elongated to front and rear relative to their depth, sheet material mounted across said frames to form the floors and sides of said sections, said sheet material forming said sides being flexible to permit the folding of said sections, securing means reacting between said sections to restrain their extension to a disposition in which the top edges of said flexible sides are stretched substantially straight, a pair of wheels mounted under the front end of said rear section substantially at the center of gravity of said cart to provide a means of transporting said cart and a pivot point about which said front and rear sections may be rocked up and down, the floor of the forward portion of said dustpan-shaped front section being substantially flat and arranged for resting upon the ground in a position which disposes said top edges of said stretched sides at a shallow acute angle relative to said ground ranging approximately from 25° to approximately 35°, the floor of said deep-bellied rear section being disposed far enough above the ground to permit it to be rocked downwardly about said wheels a sufficient distance to lift said front end off the ground and substantially balance a load disposed within said cart while said cart is being transported, said substantially rigid frames for said rear and front sections being substantially rectangular in plan, a supporting bar being connected across the front end of said rear section frame a wheel-receiving distance from its front side, wheel wells being supported between said front end of said rear section frame and said supporting bar, and said wheels being mounted within said wheel wells.

10. A cart as set forth in claim 9 wherein said wheels are rotatably mounted upon axles, and said axles being mounted across said wheel wells adjacent said floor of said rear section.

References Cited in the file of this patent

UNITED STATES PATENTS

| | | |
|---|---|---|
| 861,308 | McMann | July 30, 1907 |
| 1,015,969 | McCrary | Jan. 30, 1912 |
| 2,431,834 | Sinclair | Dec. 2, 1947 |
| 2,517,443 | Rhodes et al. | Aug. 1, 1950 |
| 2,938,748 | Johnson | May 31, 1960 |
| 2,992,011 | Becan | July 11, 1961 |
| 3,007,263 | Lair | Nov. 7, 1961 |

FOREIGN PATENTS

| | | |
|---|---|---|
| 213,538 | Germany | Sept. 23, 1909 |